(12) United States Patent
Inagaki et al.

(10) Patent No.: US 12,138,811 B2
(45) Date of Patent: Nov. 12, 2024

(54) ROBOT CONTROL DEVICE AND DIRECT TEACHING METHOD FOR ROBOT

(71) Applicant: FUJI CORPORATION, Chiryu (JP)

(72) Inventors: Shigeyoshi Inagaki, Yokkaichi (JP); Naofumi Yoshida, Obu (JP); Yasuhiro Yamashita, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 308 days.

(21) Appl. No.: 17/763,015

(22) PCT Filed: Sep. 30, 2019

(86) PCT No.: PCT/JP2019/038577
§ 371 (c)(1),
(2) Date: Mar. 23, 2022

(87) PCT Pub. No.: WO2021/064809
PCT Pub. Date: Apr. 8, 2021

(65) Prior Publication Data
US 2022/0347852 A1 Nov. 3, 2022

(51) Int. Cl.
*B25J 9/16* (2006.01)
*B25J 13/08* (2006.01)
*G05B 19/4155* (2006.01)

(52) U.S. Cl.
CPC ........... *B25J 9/1694* (2013.01); *B25J 9/1676* (2013.01); *B25J 13/085* (2013.01); *G05B 19/4155* (2013.01); *G05B 2219/50391* (2013.01)

(58) Field of Classification Search
CPC ...... B25J 9/1694; B25J 9/1676; B25J 13/085; B25J 9/1664; B25J 9/1628; B25J 9/163;
(Continued)

(56) References Cited

U.S. PATENT DOCUMENTS

| | | | |
|---|---|---|---|
| 2010/0286826 A1* | 11/2010 | Tsusaka | B25J 13/085 700/254 |
| 2017/0001301 A1* | 1/2017 | Kamiya | B25J 9/1633 |

(Continued)

FOREIGN PATENT DOCUMENTS

| | | |
|---|---|---|
| JP | 9-1 41580 A | 6/1997 |
| JP | 2017-202554 A | 11/2017 |

OTHER PUBLICATIONS

International Search Report mailed on Dec. 3, 2019 in PCT/JP2019/038577 filed on Sep. 30, 2019 (2 pages).

*Primary Examiner* — Abby Y Lin
*Assistant Examiner* — Esvinder Singh
(74) *Attorney, Agent, or Firm* — Oblon, McClelland, Maier & Neustadt, L.L.P.

(57) ABSTRACT

A robot control device executes assist control for generating an assist force in a direction of an external force applied to a robot in a case where a position of the robot is located in a first area set in a work area of the robot when the external force is applied to the robot. The robot control device stops the execution of the assist control in a case where the position of the robot is located in a second area set outside the work area of the robot. The robot control device restricts the execution of the assist control in a case where the position of the robot is located in a third area set outside the first area and inside the second area.

6 Claims, 6 Drawing Sheets

(58) Field of Classification Search
CPC ...... B25J 9/1633; B25J 9/1651; B25J 13/088; B25J 13/089; G05B 19/4155; G05B 2219/50391; G05B 2219/39529; G05B 2219/36401; G05B 2219/40382; G05B 19/423

See application file for complete search history.

(56) References Cited

U.S. PATENT DOCUMENTS

2017/0182660 A1\* 6/2017 Pipitone ................. B25J 13/085
2020/0101592 A1\* 4/2020 Sato ..................... G05B 19/423

\* cited by examiner

ROBOT CONTROL DEVICE AND DIRECT TEACHING METHOD FOR ROBOT

TECHNICAL FIELD

The present specification discloses a robot control device and a direct teaching method for a robot.

BACKGROUND ART

In the conventional art, as a robot control device, a device for assisting in an operation force for a manipulator device when a user performs direct teaching by operating the manipulator device has been proposed (refer to Patent Literature 1, for example). This robot control device acquires information of a location where the manipulator device is operated from a contact sensing section, acquires position information of an arm from a positional information acquiring section, senses an angle formed by the arm, and controls an assist amount based on the contact location and the angle of the arm. Consequently, the operability and safety of the manipulator device can be enhanced to enable direct teaching.

PATENT LITERATURE

Patent Literature 1: JP-A-2017-202554

BRIEF SUMMARY

Technical Problem

A work area of a robot is usually set in a narrower range than a movable area (movement limit area) of the robot in order to secure an appropriate operation of the robot. In this case, if the operator cannot grasp the work area of the robot, it is difficult to appropriately perform the direct teaching.

A principal object of the present disclosure is to cause an operator to appropriately execute direct teaching.

Solution to Problem

The present disclosure employs the following means in order to achieve the principal object described above.

According to the present disclosure, there is provided a robot control device that controls a robot, including a position sensor configured to sense a position of the robot; a force sensor configured to sense an external force applied to the robot by an operator's operation and a direction of the external force; and a control device configured to, when the external force is applied to the robot, execute assist control for generating an assist force in the direction of the external force applied to the robot in a case where the position of the robot is located in a first area set in a work area of the robot, stop the execution of the assist control in a case where the position of the robot is located in a second area set outside the work area of the robot, and restrict the execution of the assist control in a case where the position of the robot is located in a third area set outside the first area and inside the second area.

The robot control device of the present disclosure, when the external force is applied to the robot by the operator's operation, executes the assist control for generating the assist force in the direction of the external force applied to the robot in a case where the position of the robot is located in the first area set in the work area, and stops the execution of the assist control in a case where the position of the robot is located in the second area set outside the work area of the robot. The robot control device restricts the execution of the assist control in a case where the position of the robot is located in the third area set outside the first area and inside the second area. As described above, by changing the assist force for each area in stages, the robot control device can sensually notify the operator that the robot has deviated or is likely to deviate from the work area when the operator operates the robot to perform direct teaching. As a result, the operator can recognize the work area and appropriately execute the direct teaching.

According to the present disclosure, there is provided a direct teaching method for a robot including setting a work area in a part of a movable area of the robot; setting a first area in the work area; setting a second area outside the work area; setting a third area outside the first area and inside the second area; and when an external force is applied to the robot by an operator's operation, executing assist control for generating an assist force in a direction of the external force applied to the robot in a case where a position of the robot is located in the first area, stopping the execution of the assist control in a case where the position of the robot is located in the second area, and restricting the execution of the assist control in a case where the position of the robot is located in the third area.

According to the direct teaching method for a robot of the present disclosure, the work area is set in a part of the movable area (movement limit area) of the robot, the first area is set in the work area, the second area is set outside the work area, and the third area is set outside the first area and inside the second area. In the direct teaching method, when the external force is applied to the robot by the operator's operation, the assist control for generating the assist force in the direction of the external force applied to the robot is executed in a case where the position of the robot is located in the first area set in the work area, and the execution of the assist control is stopped in a case where the position of the robot is located in the second area set outside the work area of the robot. In the direct teaching method, the execution of the assist control is restricted in a case where the position of the robot is located in the third area. As described above, according to the direct teaching method for the robot, by changing the assist force for each area in stages, it is possible to sensually notify the operator that the robot has deviated or is likely to deviate from the work area when the operator operates the robot to perform direct teaching. As a result, the operator can recognize the work area and appropriately execute the direct teaching.

DESCRIPTION OF EMBODIMENTS

Next, embodiments of the present disclosure will be described with reference to the drawings.

Figure 1:
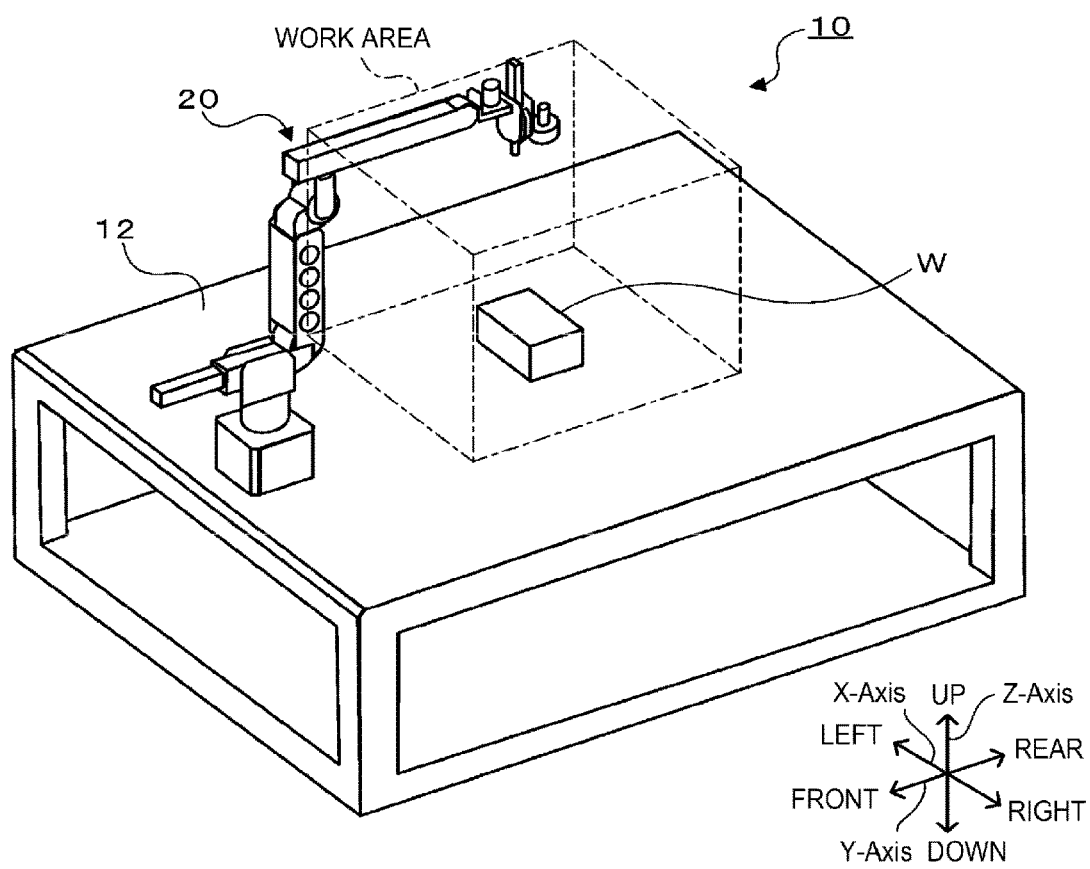
FIG. 1 is a configuration diagram schematically illustrating a configuration of work robot 10 of the present embodiment.
Figure 2:
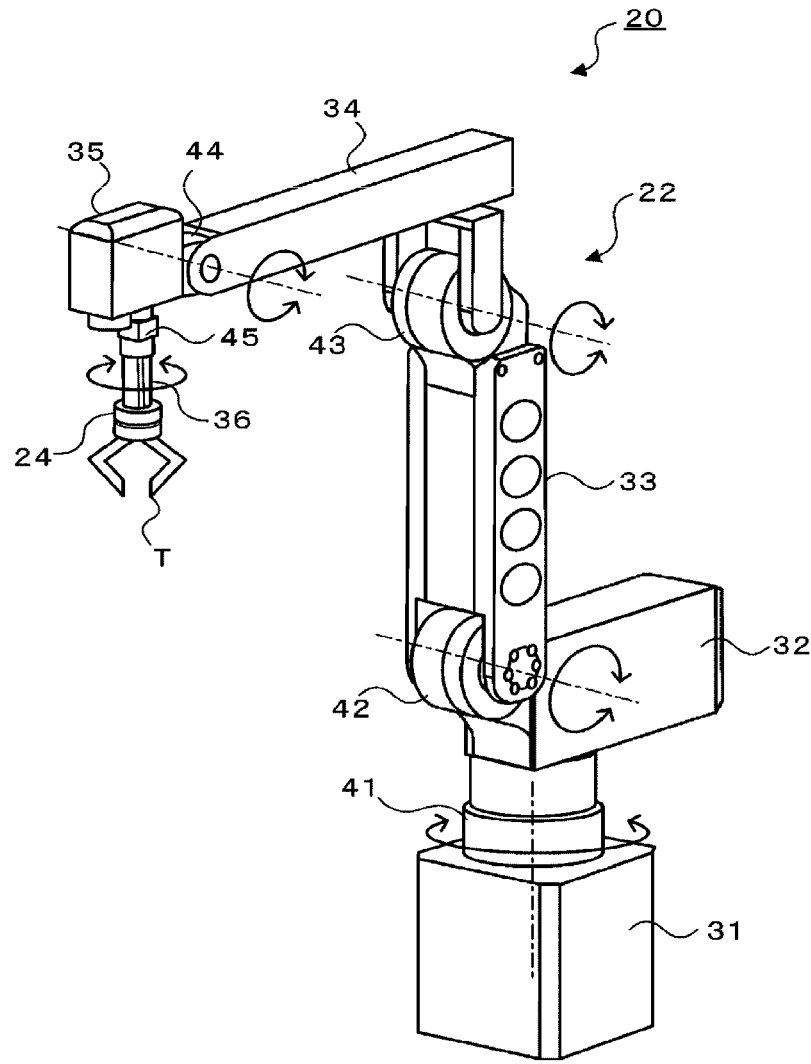
FIG. 2 is a configuration diagram schematically illustrating a configuration of robot main body 20.
Figure 3:
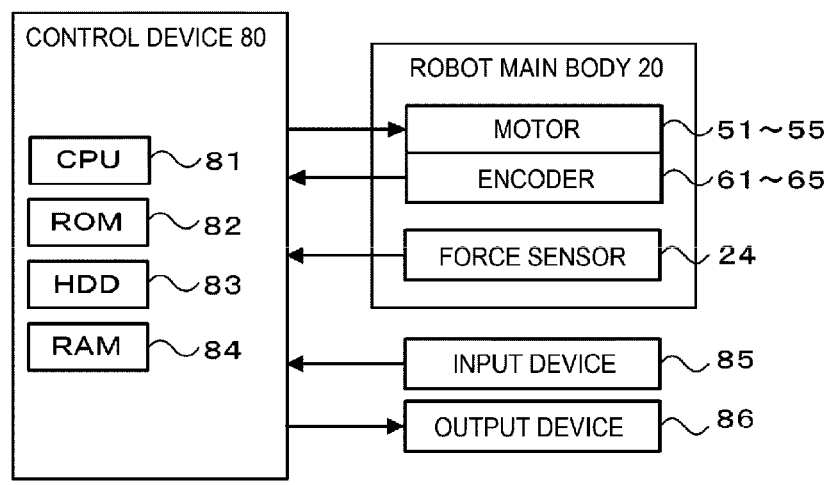
FIG. 3 is a block diagram illustrating an electrical connection relationship between robot main body 20 and control device 80.

FIG. 1 is a configuration diagram schematically illustrating a configuration of work robot 10 of the present embodiment. FIG. 2 is a configuration diagram schematically illustrating a configuration of robot main body 20. FIG. 3 is a block diagram illustrating an electrical connection relationship between robot main body 20 and control device 80. In FIG. 1, a left-right direction is an X-axis direction, a front-rear direction is a Y-axis direction, and an up-down direction is a Z-axis direction.

As illustrated in FIG. 1, work robot 10 performs a predetermined operation (for example, conveyance work for conveying workpiece W, an inspection operation for inspecting workpiece W, and an assembling operation for assembling workpiece W) on workpiece W placed in a work area of work table 12. Work robot 10 includes robot main body 20 and control device 80.

As illustrated in FIG. 2, robot main body 20 includes vertical articulated arm (hereinafter, referred to as an arm) 22 having five axes in the present embodiment. Arm 22 has six links (first link 31 to sixth link 36), and five joints (first joint 41 to fifth joint 45) that rotatably or turnably connect between the links. As illustrated in FIG. 3, each of the joints (first joint 41 to fifth joint 45) is provided with any of motors (servo motors) 51 to 55 driving the corresponding joint, and any of encoders (rotary encoders) 61 to 65 detecting a rotation angle of the corresponding motor.

As illustrated in FIG. 2, force sensor 24 configured to detect a force component acting in each axial direction of the X axis, the Y axis, and the Z axis as an external force acting on arm 22, and a torque component acting around each axial direction is attached to a distal link (sixth link 36) of arm 22.

As illustrated in FIG. 3, control device 80 is configured as a microprocessor centered on CPU 81, and includes ROM 82, HDD 83, RAM 84, an input/output interface (not illustrated), and the like in addition to CPU 81. A detection signal from force sensor 24, a detection signal from encoders 61 to 65, an input signal from input device 85, and the like are input to control device 80 via the input/output interface. Control signals for motors 51 to 55 or the like, an output signal for output device 86, and the like are output from control device 80 via the input/output interface. Here, input device 85 is, for example, an input device such as a keyboard and a mouse with which an operator performs an input operation. Output device 86 is a display device for displaying various types of information, such as a liquid crystal display.

Next, an operation of work robot 10 configured as described above will be described. First, CPU 81 of control device 80 acquires a target position and a target posture of the distal end of arm 22. Subsequently, CPU 81 calculates target angles of first to fifth joints 41 to 45 for moving the distal end of arm 22 to the target position and the target posture. CPU 81 drives and controls motors 51 to 55 such that angles of the respective joints detected by encoders 61 to 65 match the target angles.

Figure 4:
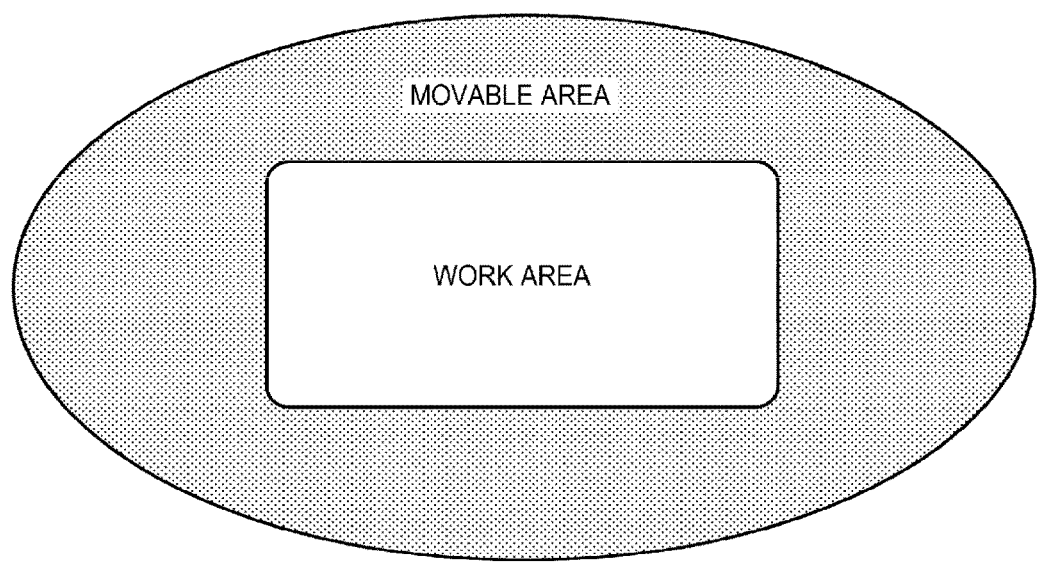
FIG. 4 is an explanatory diagram illustrating a relationship between a work area and a movable area of robot main body 20.

Here, the target position and the target posture can be set by performing teaching (direct teaching method) while the operator holds the distal end of arm 22 by hand and moves arm 22 by hand in a work area. The work area is an area where arm 22 can be appropriately moved, and is set to a narrower range than a movable area (movement limit area), as illustrated in FIG. 4. Thus, if the operator cannot recognize the work area, arm 22 may unintentionally deviate from the work area, and thus appropriate direct teaching cannot be performed. Therefore, in work robot 10 of the present embodiment, when the operator operates arm 22 to perform direct teaching, an assist force is generated in a direction in which arm 22 is operated to assist in the operator's operation, whereas when arm 22 is likely to deviate from the work area or has deviated, the assist force to be generated is changed to sensually notify the operator.

Figure 5:
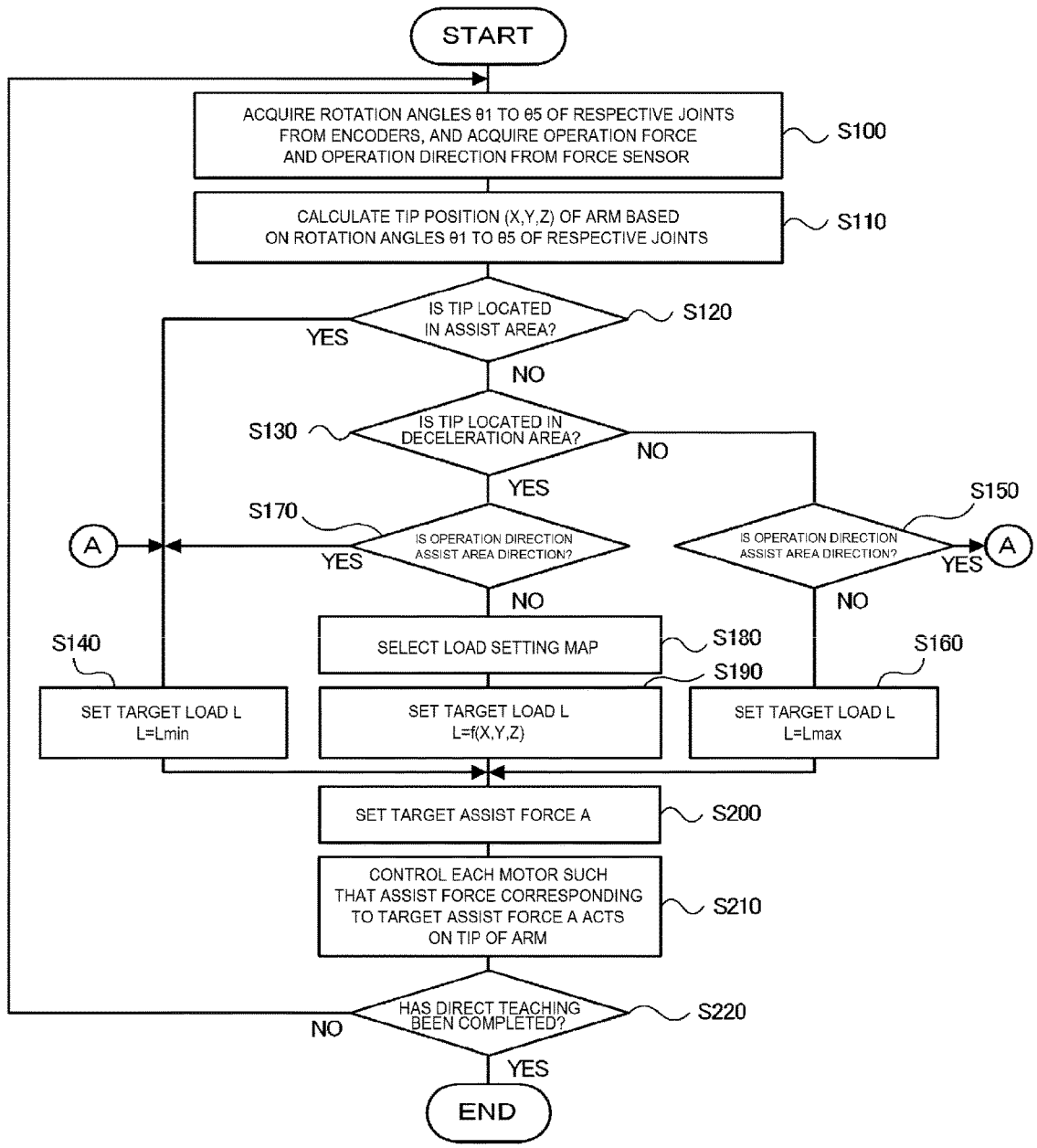
FIG. 5 is a flowchart illustrating an example of a control routine executed by control device 80.
Figure 6:
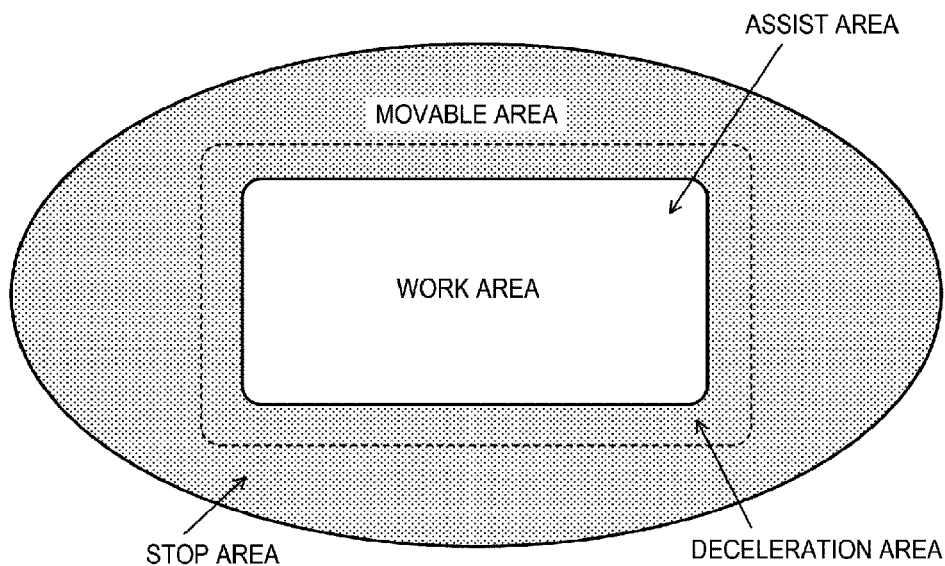
FIG. 6 is an explanatory diagram illustrating an example of a relationship between an assist area, a deceleration area, and a stop area with respect to the work area and the movable area of robot main body 20.

FIG. 5 is a flowchart illustrating an example of a control routine executed by CPU 81 of control device 80. This routine is executed when the operator performs direct teaching. In the control routine, first, CPU 81 of control device 80 acquires rotation angles θ1 to θ5 of the respective joints (first joint 41 to fifth joint 45) from encoders 61 to 65, and acquires an external force acting on arm 22 from force sensor 24 as operation force F and an operation direction of the operator for arm 22 (S100). Subsequently, CPU 81 calculates a tip position (X,Y,Z), which is a position of the tip (distal end) of arm 22 according to the forward kinematics, based on rotation angles θ1 to θ5 of the respective joints (S110). CPU 81 determines which area of an assist area (the first area), a stop area (the second area), and a deceleration area (the third area) the tip of arm 22 is located in based on the calculated tip position (X,Y,Z) (S120 and S130). The assist area is set in the work area, and the stop area is set outside the work area. The deceleration area is set between the assist area and the stop area. In the present embodiment, as illustrated in FIG. 6, the deceleration area is set outside the work area such that a boundary between the assist area and the deceleration area matches an outer edge of the work area.

When it is determined that the tip of arm 22 is located in the assist area ("YES" in S120), CPU 81 sets target load L, which is a target value of a load applied to the hand of the operator when the operator operates arm 22, to minimum value Lmin (S140). Subsequently, CPU 81 sets target assist force A that is a target value of the assist force such that the assist force corresponding to target load L acts in the operation direction (S200). CPU 81 performs assist control for driving and controlling motors 51 to 55 such that set target assist force A is output (S210). When the tip of arm 22 is located in the assist area, by minimizing the load applied to the hand of the operator, the operator can operate arm 22 with a light load in the assist area (in the work area), and thus the direct teaching can be performed smoothly.

When it is determined that the tip of arm 22 is located in the stop area ("NO" in S120 and "NO" in S130), CPU 81 determines whether an operation direction of arm 22 by the operator is an assist area direction (S150). When it is determined that the operation direction of arm 22 is not the assist area direction, CPU 81 sets target load L to maximum value Lmax (S160). CPU 81 sets target assist force A such that the assist force corresponding to target load L acts in the operation direction, and drives and controls respective motors 51 to 55 (S200 and S210). In the present embodiment, in a case where target load L is equal to maximum value Lmax, target assist force A is set to the value 0. In this case, since the assist force does not act on the tip of arm 22, it can be said that the execution of the assist control is stopped. In a case where target load L is equal to maximum value Lmax, target assist force A may be set to a negative value. In this case, a resistance force acts in a direction opposite to the operation direction of arm 22 by the operator. As described above, when the tip of arm 22 is located in the stop area, by maximizing the load applied to the hand of the operator, the operator is hardly able to operate arm 22 in the stop area (outside the work area).

When it is determined that the tip of arm 22 is located in the deceleration area ("NO" in S120 and "YES" in S130), CPU 81 determines whether the operation direction of arm 22 by the operator is located in the assist area direction (S170). When it is determined that the operation direction of arm 22 is not the assist area direction, CPU 81 sets a target load setting map for setting target load L (S180). CPU 81 sets target load L by using the set target load setting map (S190), sets target assist force A such that the assist force corresponding to target load L acts, and drives and controls respective motors 51 to 55 (S200 and S210). In this case, since target load L is set to a value greater than minimum value Lmin described above and smaller than maximum value Lmax described above, it can be said that execution of the assist control is restricted.

Figure 7:
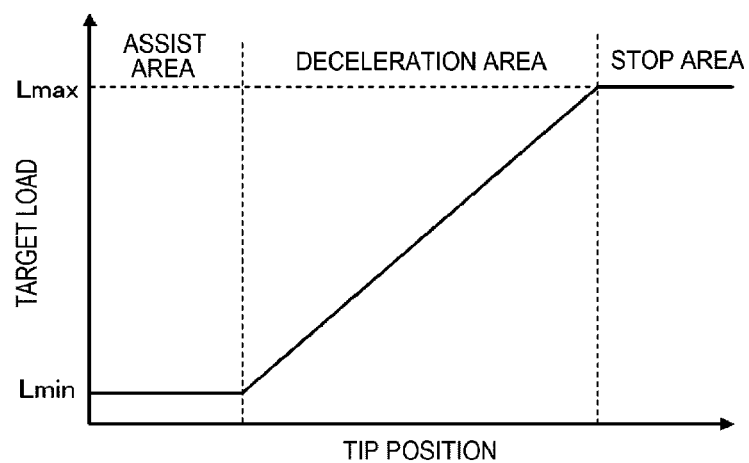
FIG. 7 is an explanatory diagram illustrating an example of a target load setting map.
Figure 8:
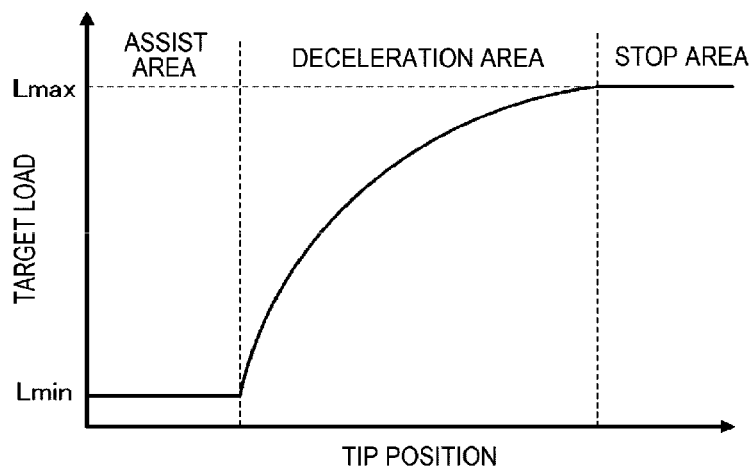
FIG. 8 is an explanatory diagram illustrating an example of a target load setting map.
Figure 9:
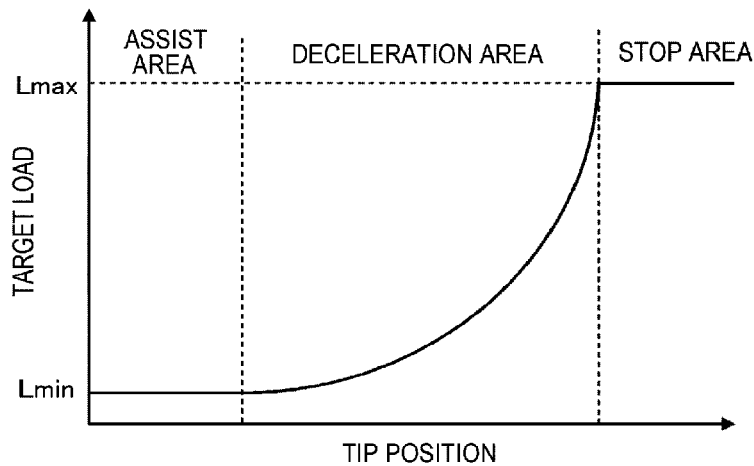
FIG. 9 is an explanatory diagram illustrating an example of a target load setting map.

Here, the process in step S180 is performed by setting one map selected by the operator operating input device 85 from among multiple target load setting maps stored in advance. FIGS. 7 to 9 are explanatory diagrams illustrating examples of target load setting maps. The map in FIG. 7 is determined such that target load L linearly changes with respect to a change in a tip position of arm 22. The map in FIG. 8 is determined such that target load L changes in a convex curve shape with respect to a change in a tip position of arm 22. The map in FIG. 9 is determined such that target load L changes in a concave curve shape with respect to a change in a tip position of arm 22. In each of the maps illustrated in FIGS. 7 to 9, target load L increases as the tip of arm 22 approaches the stop area. Consequently, when the tip of arm 22 is located in the deceleration area, the load applied to the operator's hand gradually increases as the tip of arm 22 approaches the stop area, and thus the operator can recognize that the tip of arm 22 deviates from the work area. In a case where the operator selects the map in FIG. 7, since the load changes in proportion to the change in the position of arm 22, the operator can easily recognize how much the tip of arm 22 deviates from the work area based on the magnitude of the load applied to the hand. In a case where the operator selects the map in FIG. 8, since the load sharply changes immediately after the tip of arm 22 deviates from the assist area, the operator can easily recognize that the tip of arm 22 has deviated from the assist area based on the change in the load applied to the hand. In a case where the operator selects the map in FIG. 9, since the load sharply changes when the tip of arm 22 approaches the stop area, the operator can easily recognize that the tip of arm 22 approaches the stop area based on the change in the load applied to the hand. Some of the multiple target load setting maps described above may be omitted.

When it is determined in step S150 or S170 that the operation direction of arm 22 is the assist area direction, CPU 81 sets target load L to minimum value Lmin (S140), sets target assist force A such that the assist force corresponding to target load L acts, and drives and controls respective motors 51 to 55 (S200, S210), in the same manner as in the case where the tip of arm 22 is located in the assist area. Consequently, even when the tip of arm 22 deviates from the work area, the operator can return the tip of arm 22 into the work area with a light load.

When respective motors 51 to 55 are driven and controlled in accordance with target assist force A as described above, CPU 81 determines whether the direct teaching has been completed (S220). When it is determined that the direct teaching has not been completed, CPU 81 returns to S100 to repeat the process, and when it is determined that the direct teaching has been completed, finishes the control routine.

Here, a correspondence relationship between the constituents of the present embodiment and the constituents of the present disclosure will be clarified. Arm 22 of the present embodiment corresponds to a robot, encoders 61 to 65 correspond to position sensors, force sensor 24 corresponds to a force sensor, and control device 80 corresponds to a control device.

It is needless to say that the present disclosure is not limited to the above-described embodiments, and can be implemented in various aspects as long as they belong to the technical scope of the present disclosure.

Figure 10:
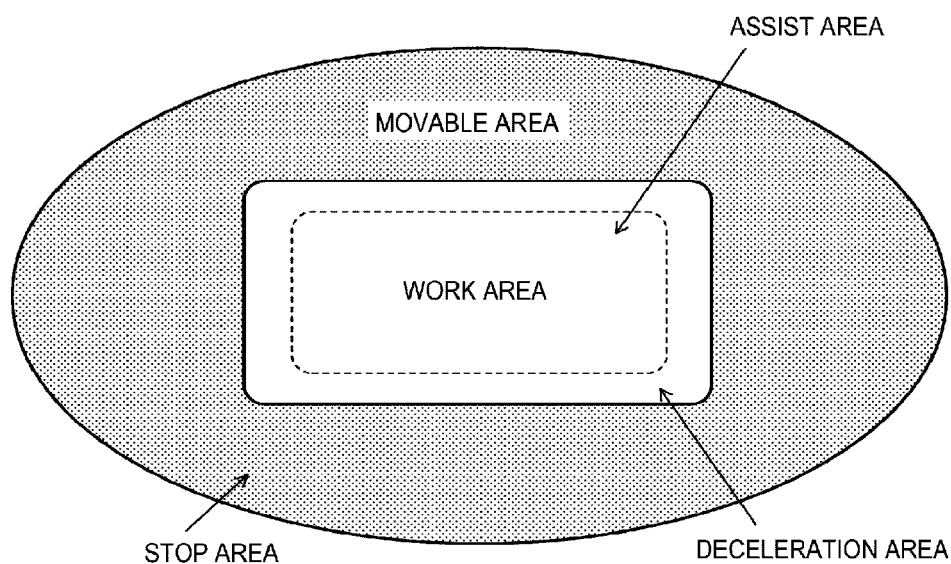
FIG. 10 is an explanatory diagram illustrating an example of a relationship between an assist area, a deceleration area, and a stop area in another embodiment.

For example, in the above embodiment, the deceleration area is set outside the work area. However, as illustrated in FIG. 10, the deceleration area may be set in the work area. The deceleration area may be set to straddle the boundary of the work area. Consequently, it is possible to cause the operator to recognize in advance that the tip of arm 22 is likely to deviate from the work area.

In the above embodiment, control device 80 determines in which area among the assist area, the stop area, and the deceleration area arm 22 is located with reference to the tip (distal end) of arm 22. However, control device 80 may perform determination by using any location as a reference position of arm 22, such as determining in which area arm 22 is located with reference to a tool attached to the tip (distal end) of arm 22.

Figure 11:
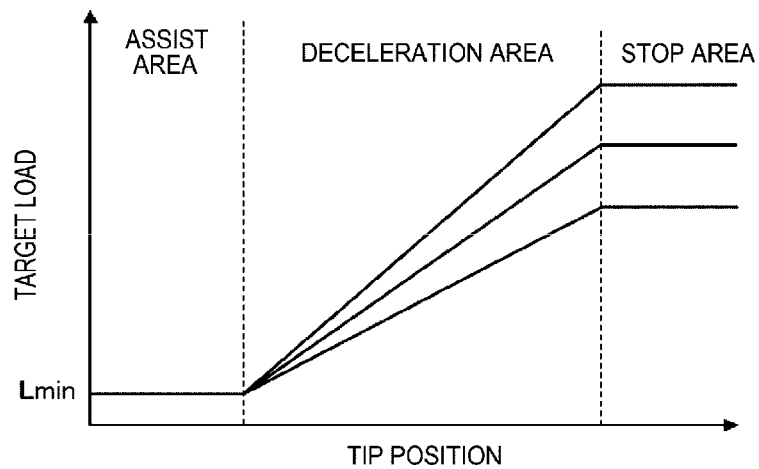
FIG. 11 is an explanatory diagram illustrating a target load setting map in another embodiment.

In the above embodiment, when the tip of arm 22 is located in the deceleration area, control device 80 sets target load L to gradually increase from minimum value Lmin to maximum value Lmax as the tip approaches the stop area. However, when the tip of arm 22 is located in the deceleration area, control device 80 may set target load L to a constant value greater than the minimum value Lmin and smaller than maximum value Lmax. As illustrated in FIG. 11, control device 80 may set target load L by using one map selected by the operator from among multiple target load setting maps each having a different inclination of a change in target load L with respect to a change in a tip position of arm 22.

In the present embodiment described above, work robot 10 is configured as a vertical articulated robot; however, the configuration is not limited to this, and work robot 10 may be configured as a horizontal articulated robot, a parallel link robot, or the like.

As described above, the robot control device of the present disclosure is a robot control device that controls a robot, and includes a position sensor configured to sense a position of the robot, a force sensor configured to sense an external force applied to the robot by an operator's operation and a direction of the external force, and a control device configured, when the external force is applied to the robot, to execute assist control for generating an assist force in the direction of the external force applied to the robot in a case where a position of the robot is located in a first area set in a work area of the robot, to stop the execution of the assist control in a case where the position of the robot is located in a second area set outside the work area of the robot, and to restrict the execution of the assist control in a case where the position of the robot is located in a third area set outside the first area and inside the second area.

The robot control device of the present disclosure, when the external force is applied to the robot by the operator's operation, executes the assist control for generating the assist force in the direction of the external force applied to the robot in a case where the position of the robot is located in the first area set in the work area, and stops the execution of the assist control in a case where the position of the robot is located in the second area set outside the work area of the robot. The robot control device restricts the execution of the assist control in a case where the position of the robot is located in the third area set outside the first area and inside the second area. As described above, by changing the assist force for each area in stages, the robot control device can sensually notify the operator that the robot has deviated or is likely to deviate from the work area when the operator operates the robot to perform direct teaching. As a result, the operator can recognize the work area and appropriately execute the direct teaching.

In such a robot control device of the present disclosure, at least a part of the third area may be set in the work area. With this configuration, the operator can sensually recognize in advance that the robot is about to deviate from the work area.

In the robot control device of the present disclosure, the control device may control the robot such that, when the position of the robot is located in the third area, the assist force is suppressed in a case where the direction of the external force applied to the robot is a direction approaching the second area, and the assist force is not suppressed in a case where the direction of the external force applied to the robot is a direction approaching the first area. With this configuration, the operator can sensually recognize that the robot has approached the second area (outside the work area), and can easily return the robot to the first area (inside the work area).

In the robot control device according to the present disclosure, the control device may control the robot such that a load on an operation of the robot by the operator is increased as the position of the robot approaches the second area when the position of the robot is located in the third area, and may control the robot such that the load is maximized when the position of the robot is located in the second area. With this configuration, the operator can sensually recognize to what extent the robot has a margin before reaching the second area (outside the work area). In this case, the control device may control the robot such that the load linearly changes with respect to a change in the position of the robot when the position of the robot is located in the third area. With this configuration, the operator can easily recognize at which position in the second area the robot is located based on a magnitude of the load. Alternatively, the control device may control the robot such that the load changes in a convex curve shape with respect to a change in the position of the robot when the position of the robot is located in the third area. With this configuration, the operator can easily recognize that the robot has deviated from the first area (inside the work area) based on the change in the load. Alternatively, the control device may control the robot such that the load changes in a concave curve shape with respect to a change in the position of the robot when the position of the robot is located in the third area. With this configuration, the operator can easily recognize that the robot has approached the second area based on the change of the load. Alternatively, there may be multiple aspects as an aspect of a change in the load with respect to a change in the position of the robot, and the control device may control the robot such that the load changes with respect to a change in the position of the robot in a selected aspect among the multiple aspects when the position of the robot is located in the third area. With this configuration, load adjustment can be performed in accordance with the preference of the operator.

Although the present disclosure has been described as a robot control device, the present disclosure may be in the form of a direct teaching method. That is, the direct teaching method of the present disclosure is a direct teaching method for a robot, and includes setting a work area in a part of a movable area of the robot, setting a first area in the work area, setting a second area outside the work area, setting a third area outside the first area and inside the second area, and when an external force is applied to the robot by an operator's operation, executing assist control for generating an assist force in a direction of the external force applied to the robot in a case where a position of the robot is located in the first area, stopping the execution of the assist control in a case where the position of the robot is located in the second area, and restricting the execution of the assist control in a case where the position of the robot is located in the third area.

According to the direct teaching method for a robot of the present disclosure, the work area is set in a part of the movable area (movement limit area) of the robot, the first area is set in the work area, the second area is set outside the work area, and the third area is set outside the first area and inside the second area. In the direct teaching method, when the external force is applied to the robot by the operator's operation, the assist control for generating the assist force in the direction of the external force applied to the robot is executed in a case where the position of the robot is located in the first area set in the work area, and the execution of the assist control is stopped in a case where the position of the robot is located in the second area set outside the work area of the robot. In the direct teaching method, the execution of the assist control is restricted in a case where the position of the robot is located in the third area. As described above, according to the direct teaching method for the robot, by changing the assist force for each area in stages, it is possible to sensually notify the operator that the robot has deviated or is likely to deviate from the work area when the operator operates the robot to perform direct teaching. As a result, the operator can recognize the work area and appropriately execute the direct teaching.

INDUSTRIAL APPLICABILITY

The present disclosure can be applied to a robot manufacturing industry or the like.

REFERENCE SIGNS LIST

10 Work robot, 12 Work table, 20 Robot main body, 22 Arm, 24 Force sensor, 31 First link, 32 Second link, 33 Third link, 34 Fourth link, 35 Fifth link, 36 Sixth link, 41 First joint, 42 Second joint, 43 Third joint, 44 Fourth joint, 45 Fifth joint, 51 to 55 Motor, 61 to 65 Encoder, 80 Control device, 81 CPU, 82 ROM, 83 HDD, 84 RAM, 85 Input device, 86 Output device, W Workpiece

The invention claimed is:

1. A robot control device that controls a robot, comprising:
   a position sensor configured to sense a position of the robot;
   a force sensor configured to sense an external force applied to the robot by an operator's operation and a direction of the external force; and
   a control device configured to
      determine the position of the robot using the position sensor and the direction of the external force using the force sensor,
      when the position of the robot is located in a first area set in a work area of the robot, set a target load, which is a target value of a load applied to a hand of the operator when the operator operates the robot, to a predetermined minimum value,
      when the position of the robot is located in a second area set outside the work area of the robot and the direction of the external force is not a first area direction, set the target load to a predetermined maximum value,
      when the position of the robot is located in the second area and the direction of the external force is the first area direction, set the target load to the predetermined minimum value,
      when the position of the robot is located in a third area set outside the first area and inside the second area and the direction of the external force is not the first area direction, set the target load using a set target load setting map, the target load being between the predetermined minimum value and the predetermined maximum value depending on the position of the robot,
      when the position of the robot is located in the third area and the direction of the external force is the first area direction, set the target load to the predetermined minimum value,
      set a target assist force based on the target load, and
      control motors of the robot based on the target assist force so as to generate the target assist force in the direction of the external force applied to the robot,
      wherein the target assist force is set to zero when the target load is set to the predetermined maximum value.

2. The robot control device according to claim 1, wherein at least a part of the third area is set in the work area.

3. The robot control device according to claim 1, wherein the target load linearly changes with respect to a change in the position of the robot when the position of the robot is located in the third area.

4. The robot control device according to claim 1, wherein the the target load changes in a convex curve shape with respect to a change in the position of the robot when the position of the robot is located in the third area.

5. The robot control device according to claim 1, wherein the target load changes in a concave curve shape with respect to a change in the position of the robot when the position of the robot is located in the third area.

6. A direct teaching method for a robot comprising:
   setting a work area in a part of a movable area of the robot;
   setting a first area in the work area;
   setting a second area outside the work area;
   setting a third area outside the first area and inside the second area;
   determining a position of the robot using a position sensor and a direction of an external force using a force sensor;
   when the position of the robot is located in the first area, setting a target load, which is a target value of a load applied to a hand of an operator when the operator operates the robot, to a predetermined minimum value;
   when the position of the robot is located in the second area and the direction of the external force is not a first area direction, setting the target load to a predetermined maximum value;
   when the position of the robot is located in the second area and the direction of the external force is the first area direction, setting the target load to the predetermined minimum value;
   when the position of the robot is located in the third area and the direction of the external force is not the first area direction, setting the target load using a set target load setting map, the target load being between the predetermined minimum value and the predetermined maximum value depending on the position of the robot;
   when the position of the robot is located in the third area and the direction of the external force is the first area direction, setting the target load to the predetermined minimum value;
   set a target assist force based on the target load; and
   controlling motors of the robot based on the target assist force so as to generate the target assist force in the direction of the external force applied to the robot,
   wherein the target assist force is set to zero when the target load is set to the predetermined maximum value.

* * * * *